May 15, 1928.  
W. L. SCRIBNER  
SHAFT BEARING  
Filed July 2, 1927  
1,669,725
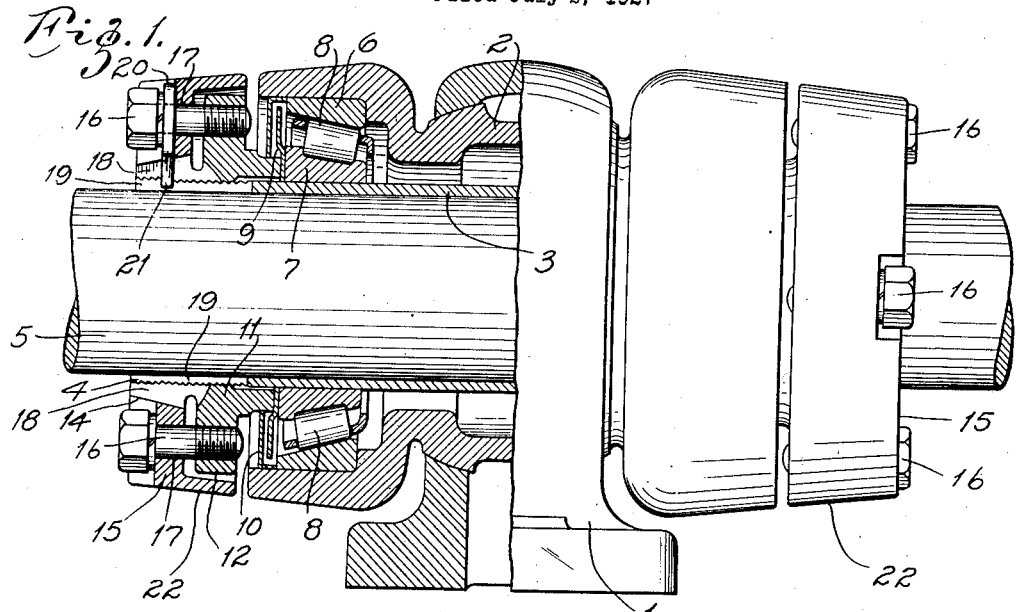
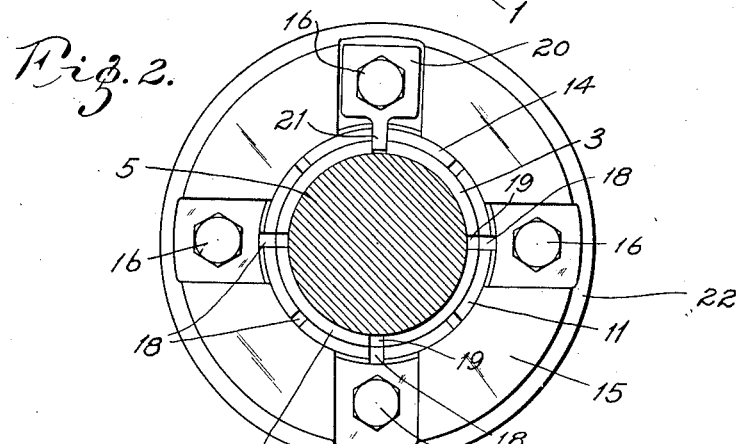
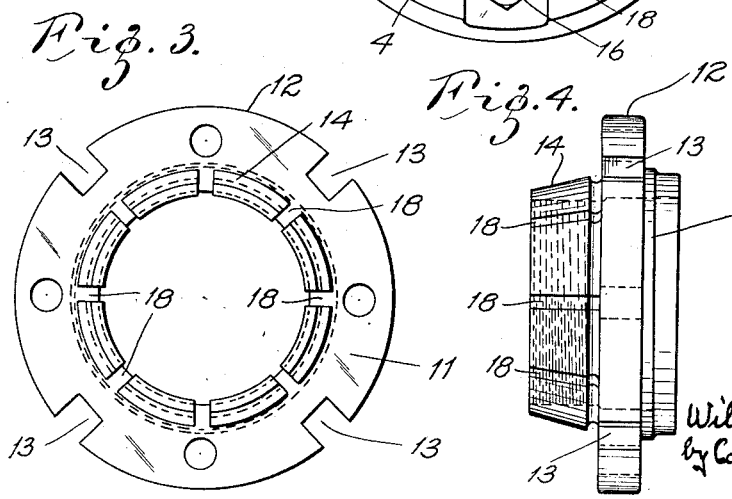
INVENTOR  
William L. Scribner,  
by Carr Harr & Gravely,  
HIS ATTORNEYS Patented May 15, 1928.

1,669,725

UNITED STATES PATENT OFFICE.

WILLIAM L. SCRIBNER, OF CANTON, OHIO, ASSIGNOR TO THE TIMKEN ROLLER BEARING COMPANY, OF CANTON, OHIO, A CORPORATION OF OHIO.

SHAFT BEARING.

Application filed July 2, 1927. Serial No. 203,033.

My invention relates to shaft bearings, commonly known as shaft hangers or pillow blocks and has for its principal object a construction embodying anti-friction bearings, permitting adjustment of the bearings, holding them securely in position and having means for securely fastening the assembly on a shaft. A further object of the invention is to permit the bearings to be adjusted at the factory and secured in correct adjustment before shipment, mounting of the assembled device on a shaft being possible without disturbing the bearing adjustment. A further object is a neat and dust-proof construction.

The invention consists principally in providing a shaft bearing assembly with bearing adjusting nuts that may be locked in position and that have tapered portions adapted to receive a clamp ring that is movably secured thereto; so that by drawing up the clamp ring on the tapered portions, the assembly may be secured to a shaft without disturbing the adjustment of the bearings. The invention further consists in the shaft bearing and in the parts and combinations and arrangements of parts hereinafter described and claimed.

In the accompanying drawing, which forms part of this specification and wherein like reference characters indicate like parts wherever they occur, Fig. 1 is a part elevation, part longitudinal sectional view of a shaft bearing embodying my invention, Fig. 2 is an end view, the shaft being shown in section, Fig. 3 is an end view of the nut for positioning the bearing and securing the bearing supporting sleeve to the shaft, and Fig. 4 is a side view thereof.

Mounted in a suitable support or pedestal 1 is a housing or box 2 through which extends a sleeve 3 that has threaded end portions 4 that project beyond the ends of the housing 2. Said sleeve 3 is mounted on a shaft 5. Mounted in the ends of the housing are outer race members or bearing cups 6. Co-operating inner bearing members or cones 7 are mounted on the sleeve; and anti-friction elements 8 are interposed therebetween, conical rollers being shown in the drawing. Washers 9 are mounted on the sleeve abutting against the bearing cones and co-operating washers 10 are mounted in the ends of the housing, so that lubricant for the bearings may be retained in the housing and dirt and other foreign matter excluded therefrom.

Mounted on each threaded end 4 of the bearing supporting sleeve 3 is a nut 11 whose end portion bears against a washer 9, holding it tight against the bearing cone 7 and securing the bearing cone in position. Each nut has an upstanding annular flange 12 in whose periphery are recesses 13 adapted to receive a spanner wrench. Thus a nut may be turned to move it endwise of the sleeve and adjust a bearing.

Each nut 11 is provided with a tapered outer portion 14 on which is seated an interiorly tapered clamp ring 15 that is secured to the flange 12 of the nut 11 as by screws 16. Preferably the clamp ring 15 is provided with recesses 17 to accommodate the heads of the screws 16. By turning the screws 16 to force the clamp ring 15 up on the tapered seat portion 14 of the nut 11, said seat portion and the end of the sleeve 3 are contracted, causing the sleeve to firmly engage the shaft 5. Each nut 11 is provided with slots 18 and the end portions of the sleeve are likewise provided with slots 19 to permit them to contract when the clamp ring 15 is drawn up tight.

Mounted on the shank of one of the screws 16 and seated in one of the recesses 17 is a plate 20 that has a projecting finger 21 that extends through alining slots 18 and 19 in the nut 11 and the sleeve 3. Thus the plate 20 locks the nut 11 in position and maintains the bearings in adjusted position. The clamp ring may be provided with a flange portion 22 that overhangs the periphery of the flange 12 of the nut 11.

The support, housing, bearings, sleeve and adjusting and securing devices may be assembled in the factory. The nuts are turned by means of a spanner wrench to obtain the desired adjustment of the bearings and the clamp rings are positioned on the tapered seats of the nuts, the locking plates being disposed so that their fingers extend into slots of the sleeve, thus preventing the nuts from turning and securing the bearings in adjusted position. The clamp rings are screwed loosely to the flanges of the nuts. When the device is mounted on a shaft, it may be moved along the shaft to the desired position by reason of the clamp rings being loose on the nuts. When the device is in position, the clamp rings are screwed up tight, to clamp the sleeve on the shaft. In this position, as shown in the drawing, the projecting portions of the clamp rings overhang the flanges of the nuts. This makes a neat construction and minimizes the risk of the adjustment of the bearings being tampered with. Of course, when, due to wear or other causes, adjustment is required, the bearings may be adjusted by loosening the clamp rings and drawing the overhanging portions clear of the flanges of the nuts to permit said flanges to be engaged by a spanner wrench.

The above described construction has numerous advantages. It permits the assembly of the device and securing of the bearings in adjusted position in the bearing factory where the bearings may best be adjusted. The housing may be filled with lubricant for the bearings and will run for a very long time without requiring attention of any sort. The device is free from projections, which is obviously advantageous in the case of a device having rotary portions. The clamping device is simple and effective and the bearing adjusting device is likewise simple and effective. Obviously numerous changes may be made without departing from the invention and I do not wish to be limited to the precise construction shown.

What I claim is:

1. A shaft bearing comprising a shaft, a sleeve thereon, a housing for said sleeve, antifriction bearings interposed between said housing and said sleeve, said sleeve having threaded and longitudinally slotted end portions, nuts on said ends of said sleeve, each of said nuts serving to position one of said bearing members, said nuts having tapered slotted seat portions and internally tapered clamp rings mounted on said seat portions, whereby said sleeve may be clamped to said shaft.

2. A shaft bearing comprising a shaft, a sleeve thereon, a housing for said sleeve, antifriction bearings interposed between said housing and said sleeve, said sleeve having threaded and longitudinally slotted end portions extending beyond the ends of said housing, nuts on said ends of said sleeve, each of said nuts serving to position one of said bearing members, said nuts having tapered slotted seat portions and internally tapered clamp rings mounted on said seat portions, whereby said sleeve may be clamped to said shaft.

3. A shaft bearing comprising a shaft, a sleeve thereon, a housing for said sleeve, an antifriction bearing comprising cup, cone and conical rollers interposed between said housing and said sleeve, said sleeve having a threaded and longitudinally slotted end portion, a nut on said end of said sleeve, serving to position said bearing cone, said nut having a tapered and slotted seat portion and an internally tapered clamp ring mounted on said seat portion, whereby said sleeve may be clamped to said shaft.

4. A shaft bearing comprising a shaft, a sleeve thereon, a housing for said sleeve, an antifriction bearing comprising cup, cone and conical rollers interposed between said housing and said sleeve, said sleeve having a threaded and longitudinally slotted end portion extending beyond the ends of said housing, a nut on said end of said sleeve serving to position said bearing cone, said nut having a tapered and slotted seat portion and an internally tapered clamp ring mounted on said seat portion, whereby said sleeve may be clamped to said shaft.

5. A shaft bearing comprising a shaft, a sleeve thereon, a housing for said sleeve, antifriction bearings interposed between said housing and said sleeve, said sleeve having threaded and longitudinally slotted end portions extending beyond the ends of said housing, nuts on said ends of said sleeve, each of said nuts serving to position one of said bearing members and having an annular rib provided with recesses for cooperation with a wrench, said nuts also having tapered slotted seat portions, and internally tapered clamp rings mounted on said seat portions, whereby said sleeve may be clamped to said shaft.

6. A shaft bearing comprising a shaft, a sleeve thereon, a housing for said sleeve, antifriction bearings interposed between said housing and said sleeve, said sleeve having threaded and longitudinally slotted end portions extending beyond the ends of said housing, nuts on said ends of said sleeve, each of said nuts serving to position one of said bearing members and having an annular rib provided with recesses for cooperation with a wrench, said nuts also having tapered slotted seat portions and internally tapered clamp rings mounted on said seat portions whereby said sleeve may be clamped to said shaft, said clamp rings having flange portions overhanging said nut flanges.

7. A shaft bearing comprising a shaft, a sleeve thereon, a housing for said sleeve, antifriction bearings interposed between said housing and said sleeve, said sleeve having threaded and longitudinally slotted end portions extending beyond the ends of said housing, nuts on said ends of said sleeve, each of said nuts serving to position one of said bearing members and having an annular rib provided with recesses for cooperation with a wrench, said nuts also having tapered slotted seat portions and internally tapered clamp rings mounted on said seat portions, whereby said sleeve may be clamped to said shaft, and means on said clamp rings for securing said nut against rotation relative to said sleeve.

8. A shaft bearing comprising a shaft, a sleeve thereon, a housing for said sleeve, antifriction bearings interposed between said housing and said sleeve, said sleeve having threaded and longitudinally slotted end portions extending beyond the ends of said housing, nuts on said ends of said sleeve, each of said nuts serving to position one of said bearing members and having an annular rib, said nuts also having tapered slotted seat portions, internally tapered clamp rings mounted on said seat portions and screws in said clamp rings threaded into holes in said nut flanges whereby said sleeve may be clamped to said shaft.

9. A shaft bearing comprising a shaft, a sleeve thereon, a housing for said sleeve, antifriction bearings interposed between said housing and said sleeve, said sleeve having threaded and longitudinally slotted end portions extending beyond the ends of said housing, nuts on said ends of said sleeve, each of said nuts serving to position one of said bearing members and having an annular rib, said nuts also having tapered slotted seat portions, internally tapered clamp rings mounted on said seat portions and screws in said clamp rings threaded into holes in said nut flanges whereby said sleeve may be clamped to said shaft, said seat portions and said threaded ends of said sleeve being slotted, and a locking plate mounted on the shank of a screw of each clamp ring, each of said locking plates having a finger extending into alining slots in said seat portions and said sleeve, to secure said nuts against rotation relative to said sleeve.

10. A shaft bearing comprising a shaft, a sleeve thereon, a housing for said sleeve, an antifriction bearing interposed between said housing and said sleeve, a nut threaded on to the end of said sleeve for adjusting and positioning said bearing, said nut having a tapered seat portion, a clamp ring mounted on said tapered seat portion, said seat portion and the end of said sleeve having longitudinal slots, and a locking plate secured to said clamp ring and having a finger extending into alining slots in said seat portion and said sleeve, thereby holding said nut in position.

Signed at Canton, Ohio, this 27 day of June 1927.

WILLIAM L. SCRIBNER.